(12) United States Patent
Patil et al.

(10) Patent No.: US 10,660,104 B2
(45) Date of Patent: May 19, 2020

(54) INACTIVITY COORDINATION FOR MULTI-RAT DUAL-CONNECTIVITY

(71) Applicant: Verizon Patent and Licensing Inc., Arlington, VA (US)

(72) Inventors: Sudhakar Reddy Patil, Flower Mound, TX (US); Lalit R. Kotecha, San Ramon, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 88 days.

(21) Appl. No.: 15/997,116

(22) Filed: Jun. 4, 2018

(65) Prior Publication Data
US 2019/0373593 A1 Dec. 5, 2019

(51) Int. Cl.
*H04W 4/70* (2018.01)
*H04W 72/04* (2009.01)
*H04W 76/15* (2018.01)
*H04W 76/30* (2018.01)

(52) U.S. Cl.
CPC ......... *H04W 72/048* (2013.01); *H04W 76/15* (2018.02); *H04W 76/30* (2018.02); *H04W 4/70* (2018.02)

(58) Field of Classification Search
CPC ... H04W 72/048; H04W 76/30; H04W 76/15; H04W 4/70
See application file for complete search history.

(56) References Cited

U.S. PATENT DOCUMENTS

2017/0064769 A1* 3/2017 Zhang .................. H04W 76/38

FOREIGN PATENT DOCUMENTS

WO WO-2018117928 A1 * 6/2018 ............ H04W 52/02

* cited by examiner

*Primary Examiner* — Moo Jeong (57) ABSTRACT

Systems and methods described herein provide for coordination of inactivity procedures between wireless stations in a multi-RAT dual connectivity scenario. A wireless station identifies, for an end device, a multi-radio access technology (RAT) dual connectivity scenario with dedicated bearers and detects inactivity for a bearer using the master wireless station. In response to the detecting, the master wireless station sends, to a secondary wireless station, an inactivity status check for another bearer of the multi-RAT dual connectivity scenario. When a response to the inactivity status check is received from the secondary wireless station within a designated time window, the master wireless station waits for a release request from the secondary wireless station and initiates an inactivity procedure for the end device when the release request is received.

20 Claims, 7 Drawing Sheets

INACTIVITY COORDINATION FOR MULTI-RAT DUAL-CONNECTIVITY

BACKGROUND

Dual connectivity solutions may be employed when user equipment (UE) can connect to different Radio Access Technology (RAT) types simultaneously. For example, a UE may want to connect to a Long Term Evolution (LTE) network and a Next Generation mobile network for a specific bearer simultaneously.

LTE is a mobile telecommunications standard for wireless communication involving mobile user equipment, such as mobile devices and data terminals. LTE networks include existing Fourth Generation (4G), and 4.5 Generation (4.5G) wireless networks. Next Generation mobile networks, such as Fifth Generation (5G) mobile networks, have been proposed as the next evolution of mobile wireless networks. Next Generation mobile networks are designed to increase data transfer rates, increase spectral efficiency, improve coverage, improve capacity, and reduce latency. The proposed 5G mobile telecommunications standard, among other features, operates in the millimeter wave bands (e.g., 28, 38, and 60 Gigahertz (GHz)), and supports more reliable, massive machine communications (e.g., machine-to-machine (M2M), Internet of Things (IoT), etc.).

DETAILED DESCRIPTION OF THE PREFERRED EMBODIMENTS

The following detailed description refers to the accompanying drawings. The same reference numbers in different drawings may identify the same or similar elements.

Dual connectivity solutions are employed when end devices (e.g., user equipment) can connect to different Radio Access Technology (RAT) types simultaneously. For example, with development of future generation radio technologies, such as Fifth Generation New Radio (5G NR), an end device will be able to connect simultaneously to a 5G NR radio access network (RAN) and an Evolved Universal Mobile Telecommunications System (UMTS) Terrestrial Radio Access Network (E-UTRAN) of a Long Term Evolution (LTE) network. In such cases, downlink and uplink packets can be transmitted over either/both of the radio access technologies. Thus, end devices can connect simultaneously to 5G NR and E-UTRAN for different bearers (e.g., different logical channels with particular end-to-end quality of service (QoS) requirements). In such instances, depending on radio coverage, some of these bearers could be supported by different wireless stations (such as an evolved NodeB for the E-UTRAN and a next generation NodeB for the 5G RN).

Managing inactivity is an important process in cellular networks, as this capability allows for sharing of radio resources across many end devices. If all bearers are supported by the same wireless station, then that wireless station can easily monitor inactivity of the bearers. So when all bearers are inactive, radio resources are released and the user equipment (or UE) is switched to an idle state. In dual connectivity networks, bearers for the same end device may be handled by different wireless stations. Thus, inactivity observation and resultant actions must be coordinated between the wireless stations to prevent either a premature or a delayed release of end device resources.

Systems and methods described herein provide for coordination of inactivity procedures between wireless stations in a multi-RAT dual connectivity scenario. A wireless station may identify, for an end device, a multi-radio access technology (RAT) dual connectivity scenario with dedicated bearers and may detect inactivity for a bearer using the master wireless station. In response to the detecting, the master wireless station may send, to a secondary wireless station, an inactivity status check for another bearer of the multi-RAT dual connectivity scenario. When a response to the inactivity status check is received from the secondary wireless station within a designated time window, the master wireless station may wait for a release request from the secondary wireless station and may initiate an inactivity procedure for the end device when the release request is received.

Figure 1:
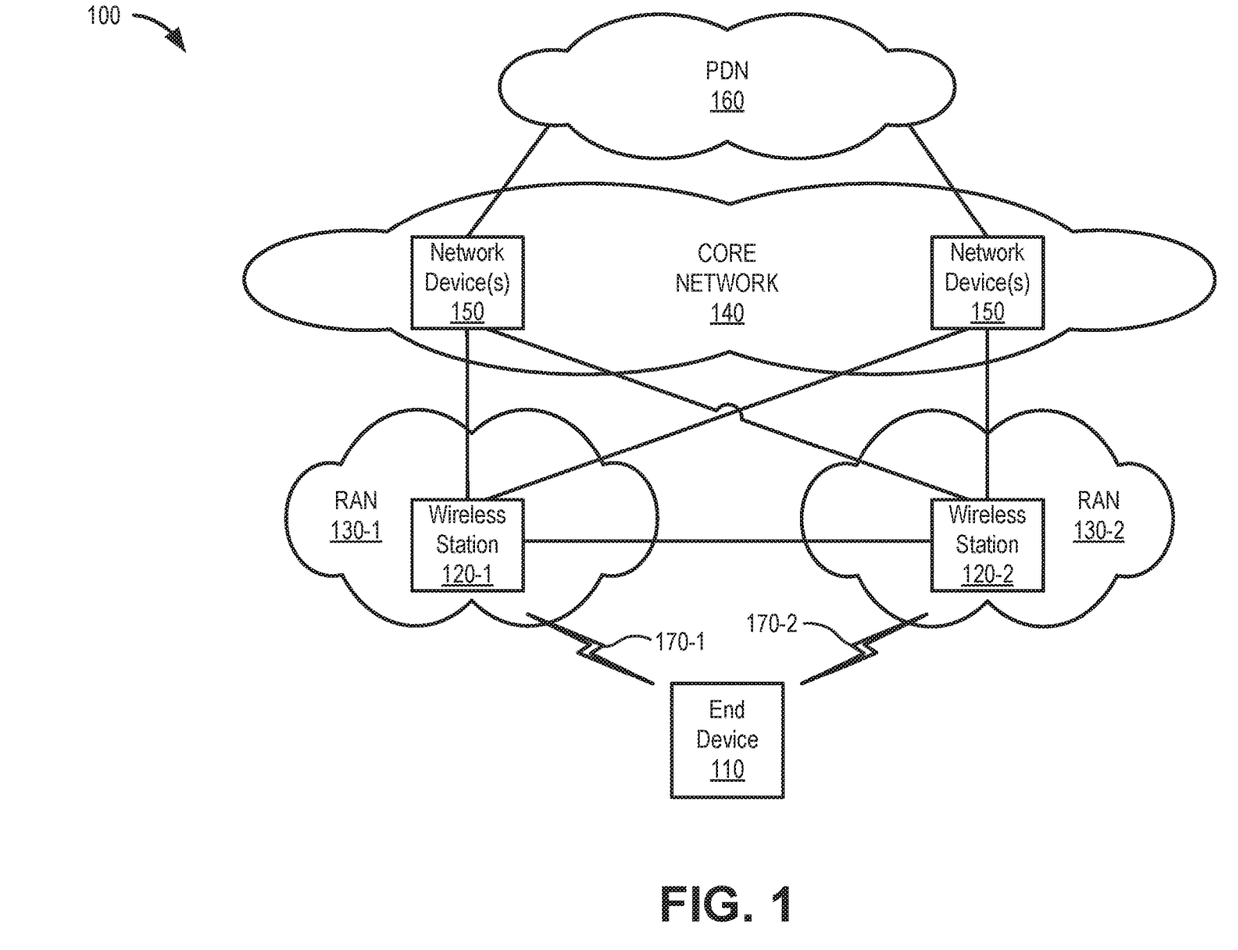
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include an end device 110, a wireless station 120-1 for one type of RAN 130-1, a wireless station 120-2 for a different type of RAN 130-2, a core network 140 with network devices 150, and a packet data network (PDN) 160. Wireless stations 120-1 and 120-2 may be referred to herein collectively as wireless stations 120 and generically as wireless station 120, and RAN 130-1 and RAN 130-2 may be referred to herein collectively as RANs 130 and generically as RAN 130. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

In the configuration of FIG. 1, end device 110 (e.g., a UE) may use wireless channels 170-1 and 170-2 (referred to collectively as wireless channels 170) to access wireless stations 120-1 and 120-2, respectively. Wireless channels 170 may correspond, for example, to physical layer protocols in accordance with different RAT types. For example, wireless channel 170-1 may correspond to physical layer protocols for 4G RAN standards (e.g., 3GPP standards for 4G air interfaces, etc.), while wireless channel 170-2 may correspond to physical layer protocols for 5G New Radio standards (e.g., 3GPP standards for 5G air interfaces, etc.). As described further herein, wireless channels 170 may be used to provide communications to/from end device 110 using a dual-connectivity with different bearers.

End device 110 may include any type of mobile device having multiple coverage mode capabilities, and thus communicate simultaneously with different wireless stations (e.g., wireless stations 120) using different wireless channels (e.g., channels 170) corresponding to the different RANs (e.g., RANs 130). End device 110 may be a mobile device that may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, end device 110 may be implemented as a machine-type communications (MTC) device, an Internet of Things (IoT) device, a machine-to-machine (M2M) device, etc. According to implementations described herein, end device 110 may be provisioned (e.g., via a subscriber identity module (SIM) card or another secure element) to recognize particular network identifiers (e.g., associated with RANs 130).

Wireless station 120 may include a network device that has computational and wireless communicative capabilities. Wireless station 120 may include a transceiver system that connects end device 110 to other components of RAN 130 and core network 140 using wireless interfaces. Wireless station 120 may be implemented as a base station (BS), a base transceiver station (BTS), a Node B, an evolved Node B (eNB), an evolved LTE (eLTE) eNB, a next generation Node B (gNB), a remote radio head (RRH), an RRH and a baseband unit (BBU), a BBU, or other type of wireless node (e.g., a picocell node, a femtocell node, a microcell node, etc.) that provides wireless access to one of RANs 130. Each wireless station 120 may support a RAN 130 having different RAT-types. For example, in one implementation, RAN 130-1 may include an E-UTRAN for an LTE network, while RAN 130-2 may include a 5G NR RAN.

Core network 140 may include one or multiple networks of one or multiple types. For example, core network 140 may be implemented to include a terrestrial network and/or a satellite network. According to an exemplary implementation, core network 140 includes a complementary network pertaining to multiple RANs 130. For example, core network 140 may include the core part of an LTE network, an LTE-A network, a 5G network, a legacy network, and so forth.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a packet data network gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140.

PDN 160 may include one or more networks, such as a local area network (LAN), a wide area network (WAN), a metropolitan area network (MAN), a telephone network, the Internet, etc., capable of communicating with end devices 110. In one implementation, PDN 160 includes a network that provides data services (e.g., via packets or any other Internet protocol (IP) datagrams).

The number and arrangement of devices in environment 100 are exemplary. According to other embodiments, environment 100 may include additional devices and/or differently arranged devices, than those illustrated in FIG. 1.

Figure 2:
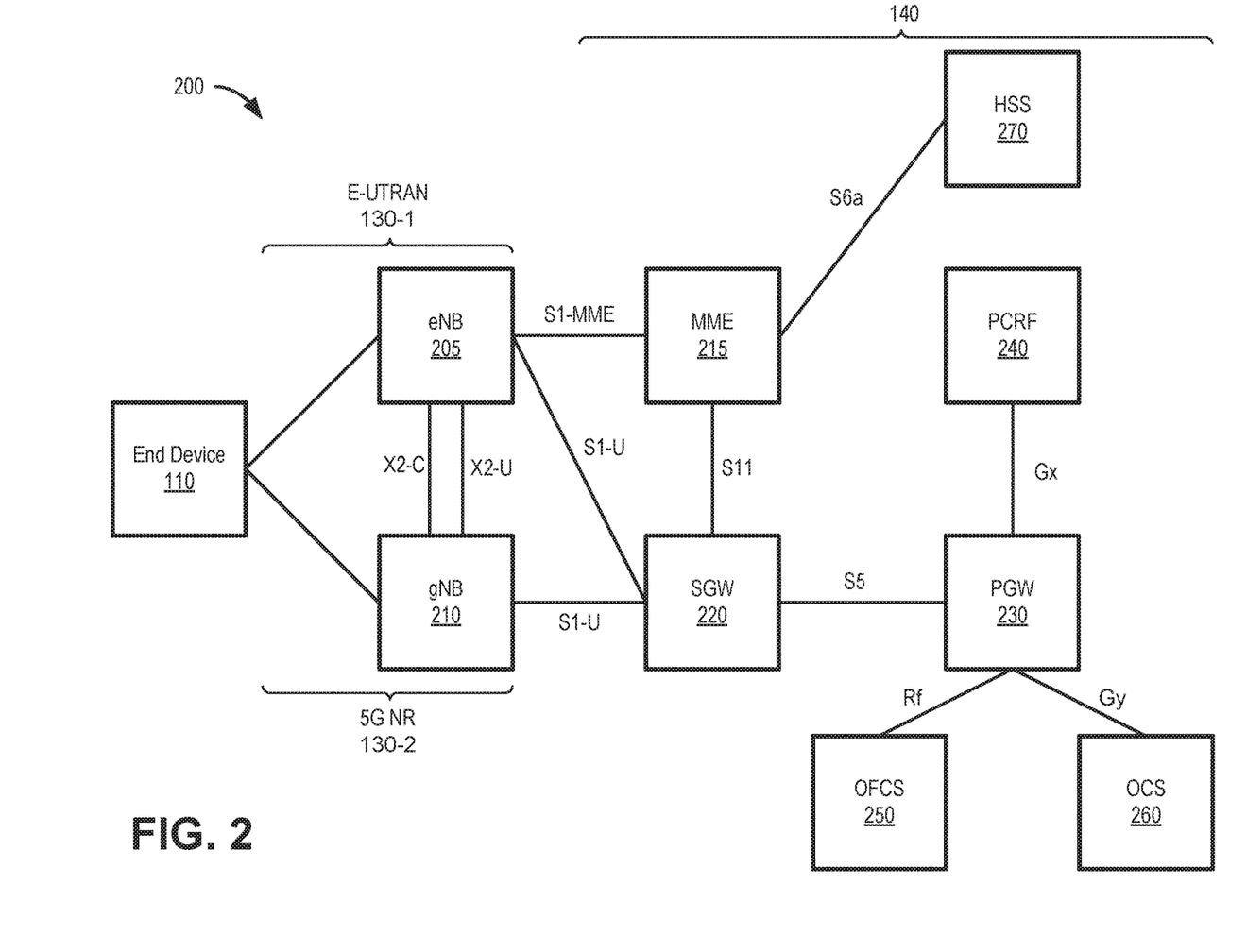
FIG. 2 is a diagram illustrating connections among devices in an exemplary portion of the network environment of FIG. 1.

FIG. 2 is a diagram illustrating connections among devices in an exemplary portion 200 of network environment 100. In the configuration of FIG. 2, dual connectivity capability is provided to end device 110 using E-UTRAN 130-1 and 5G NR RAN 130-2. Wireless stations 120-1 and 120-2 for RANs 130-1 and 130-2 may be implemented as eNB 205 and gNB 210, respectively. Core network 140 may include network elements of an Evolved Packet Core (EPC, also referred to as a 4G core). As shown in FIG. 2, core network 140 may include an MME 215, an SGW 220, a PGW 230, a Policy Charging Rules Function (PCRF) 240, an offline charging system (OFCS) 250, an online charging system (OCS) 260, and an HSS 270. In other implementations, core network 140 may include network elements for a 5G core.

eNB 205 may include one or more devices and other components having functionality that allow end device 110 to wirelessly connect to RAN 130-1. eNB 205 may interface with core network 140 via a S1 interface, which may be split into a control plane S1-MME interface and a user plane S1-U interface. S1-MME interface may provide an interface between eNB 205 and MME device 215. The S1-U interface may provide an interface between eNB 205 and SGW 220. The S1-U interface may be implemented, for example, using a General Packet Radio Service (GPRS) Tunneling Protocol User Plane (GTPv2-U). In the configuration of FIG. 2, eNB 205 serves as a "master" node, while gNB 210 serves as a "secondary" node.

gNB 210 may include one or more devices and other components having functionality that allow end device 110 to wirelessly connect to 5G NR RAN 130-2. gNB 210 may interface with SGW 220 of core network 140 via an S1-U interface. eNB 205 and gNB 210 may communicate with each other via an X2 interface. An X2 interface may be implemented, for example, with a protocol stack that includes an X2 application protocol and Stream Control Transmission Protocol (SCTP). As shown in FIG. 2, X2 interface may be divided into a control plane interface, X2-C, and a user plane interface, X2-U. Consistent with embodiments described herein, the X2-C interface may be used to monitor inactivity and coordinate inactivity procedures for end device 110. Conversely, the X2-U interface may be used to route data packets for end device 110 between eNB 205 and gNB 210.

MME 215 may include a network device that implements control plane processing for core network 140. For example, MME 215 may implement tracking and paging procedures for end device 110, may activate and deactivate bearers for end device 110, may authenticate a user of end device 110, and may interface to non-LTE RANs, such as 5G NR RAN 130-2. MME 215 may also select a particular SGW 220 for end device 110. MME 215 may communicate with SGW 220 through an S11 interface. The S11 interface may be implemented, for example, using GTPv2. The S11 interface may be used to create and manage a new session for a particular end device 110.

SGW 220 may provide an access point to and from end device 110, may handle forwarding of data packets for end device 110, and may act as a local anchor point during handover procedures between eNBs 205 and/or gNBs 210. SGW 220 may interface with PGW 230 through an S5 interface. The S5 interface may be implemented, for example, using GTPv2.

PGW 230 includes a network or computational device that functions as a gateway to PDN 160. In one exemplary implementation, PGW 230 may be a traffic exit/entry point for core network 140. End device 110 may connect to PGW 230 via one or more tunnels established between gNB 210 and PGW 230, such as one or more GTP tunnels. End device 110 may simultaneously connect to more than one PGW for accessing multiple PDNs 160. PGW 230 may perform policy enforcement, packet filtering for each user, charging support, lawful intercept, and packet screening. PGW 230 may also act as an anchor for mobility between 3GPP and non-3GPP technologies.

PCRF 240 may include a network or computational device that provides policy control decision and flow based charging control functionalities. PCRF 240 may provide network control regarding service data flow detection, gating, QoS and flow based charging, etc. PCRF 240 may determine how a data stream is treated once mapped to a bearer, and may ensure that the user plane traffic mapping and treatment is in accordance with a user's subscriber profile. According to an implementation described herein, PCRF 240 may communicate with PGW 230 using a Gx interface. The Gx interface may be implemented, for example, using a Diameter-based protocol.

OFCS 250 may include a network or computational device that serves as an offline (post-paid) management system for services provided to end device 110. OFCS 250 may receive information from PGW 230 via an Rf interface, implemented, for example, using a Diameter protocol.

OCS 260 may include a network or computational device that serves as a credit management system that may affect, in real-time, services provided to end device 110. OCS 260 may store account settings, such a data usage plan limits, for individual accounts. Some accounts may include multiple subscribers (e.g., multiple end devices 110). OCS 260 may log data usage per account and/or per subscriber. OCS 260 may receive information from PGW 230 via a Gy interface implemented, for example, using a Diameter protocol.

HSS 270 may store information associated with end device 110 and/or information associated with users/owners of end device 110. For example, HSS 270 may store user profiles, such as a Subscriber Profile Repository (SPR), that include authentication and access authorization information. As described further herein, the subscriber profiles may store use restrictions or bearer preferences for a particular end device 110, such as restricting a particular end device 110 to certain aggregated bandwidth limits over a dual-connectivity bearer. HSS 270 may communicate with MME 215 through an S6a interface. The subscriber profile may also identify particular services to which a user of end device 110 has subscribed.

Figure 3:
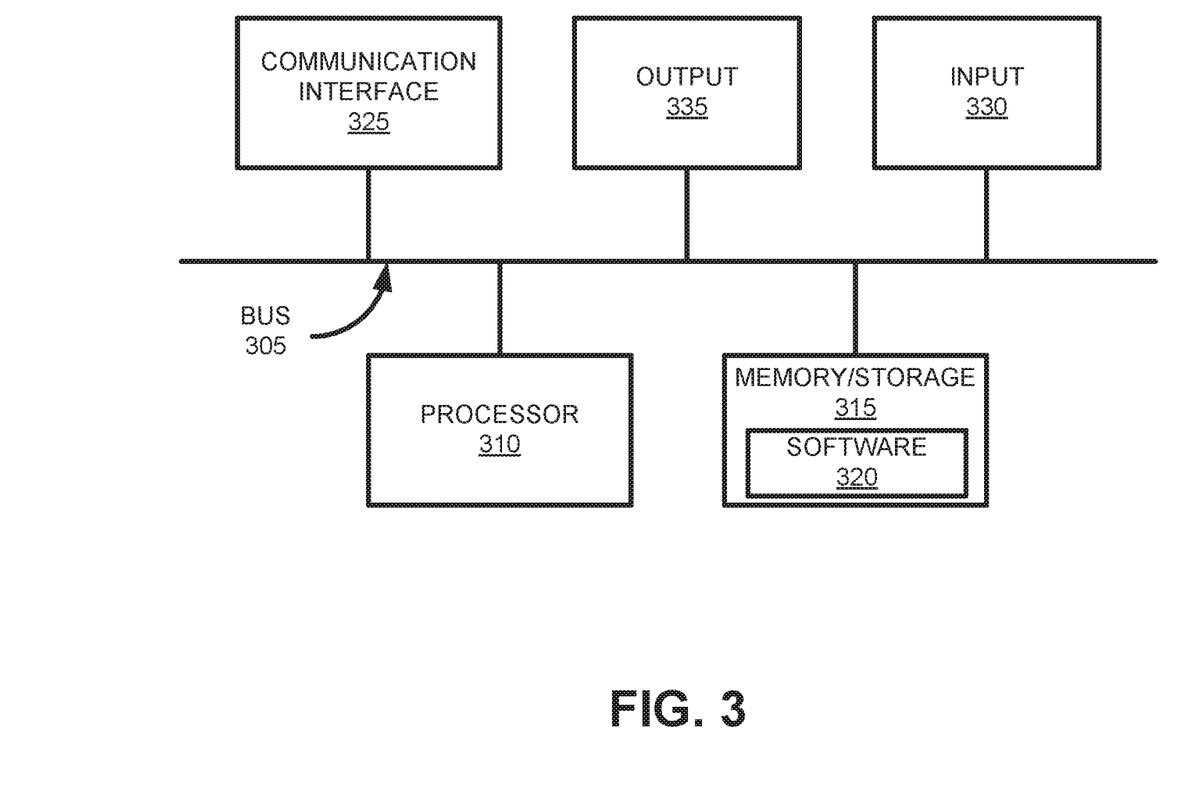
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in end device 110, eNB 205, gNB 210, MME 215, SGW 220, PGW 230, PCRF 240, OFCS 250, OCS 260, and HSS 270. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation, and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, end device 110 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing instructions contained in a computer-readable medium, such as software 320 stored by memory/storage 315. A computer-readable medium may be defined as a non-transitory memory device. A memory device may include space within a single physical memory device or spread across multiple physical memory devices. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
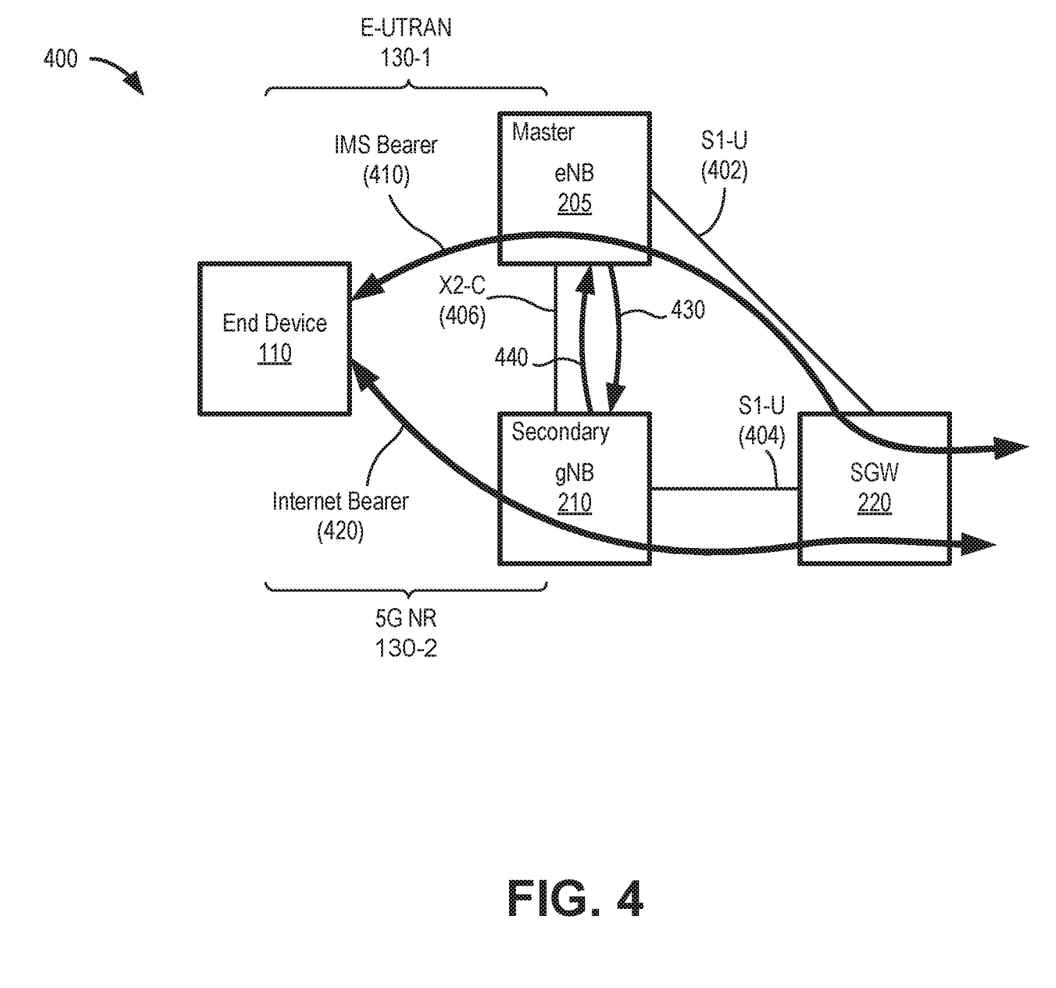
FIG. 4 is a diagram illustrating exemplary communications for monitoring inactivity over dual-connectivity bearers in a portion of the network environment of FIG. 2.

FIG. 4 is diagram illustrating exemplary communications for monitoring inactivity over dual-connectivity bearers in a portion 400 of network environment 100. In FIG. 4, assume an Internet Protocol Multimedia Subsystem (IMS) default bearer 410 for end device 110 is handled by eNB 205 (serving as the master node) and an Internet default bearer 420 for end device 110 is handled by gNB 210 (serving as the secondary node). IMS default bearer 410 may be used to transmit packets to/from core network 140 over E-UTRAN 130-1 and S1-U interface 402, while Internet default bearer 420 may be used to transmit packets to/from core network 140 over 5G NR RAN 130-2 and S1-U interface 404.

According to implementations described herein, eNB 205 (as the master node) may monitor inactivity for bearer 410 and may communicate with gNB 210 (as the secondary node) via X2-C interface 406 to monitor inactivity for bearer 420. Particularly, when inactivity is detected on bearer 410, eNB 205 may send an inactivity status check 430 to gNB 210 via X2-C interface 406, and gNB 210 may provide an inactivity status check response 440 to eNB 205 via X2-C interface 406. Inactivity status check 430 may include a bearer identifier (ID) for Internet default bearer 420 and may prompt gNB 210 to respond with inactivity status check response 440. Inactivity status check response 440 may include the bearer ID for Internet default bearer 420 and a status field, indicating, for example, an inactive or active status for Internet default bearer 420. Depending on the number of bearers assigned to the secondary node (e.g., gNB 210), inactivity status check 430 and inactivity status check response 440 may include multiple bearer IDs. According to one implementation, inactivity status check 430 and inactivity status check response 440 may be new messages for X2-C interface 406 (e.g., not previously defined in wireless network standards). In another implementation, inactivity status check 430 and inactivity status check response 440 may be new message fields or extensions, which may be appended to or "piggy-backed" on existing message structures over X2-C interface 406.

Figure 5:
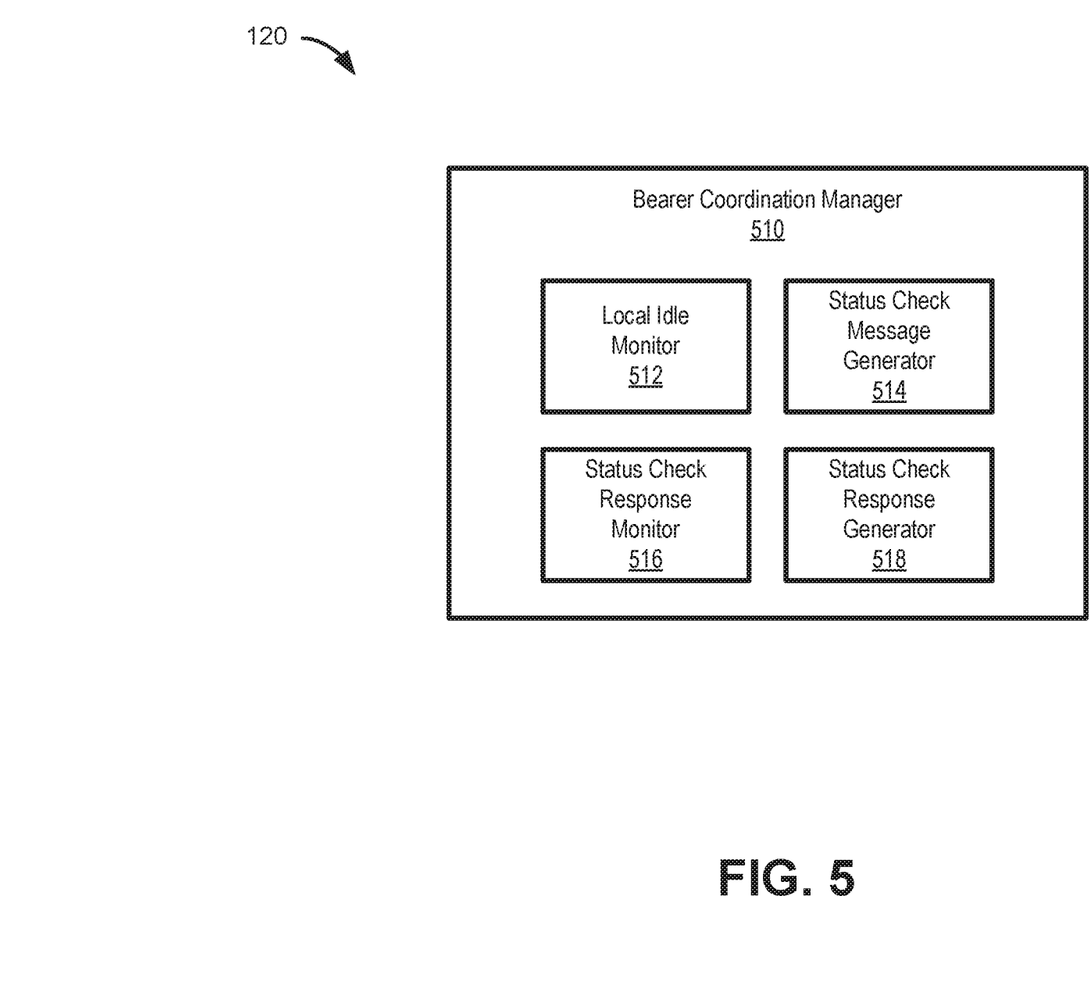
FIG. 5 is a block diagram of exemplary logical components of one of the wireless stations of FIG. 1.

FIG. 5 is a block diagram illustrating logical components of a wireless station 120, such as eNB 205 or gNB 210. The logical components of FIG. 5 may be implemented, for example, by processor 310 in conjunction with memory 315/software 320. As shown in FIG. 5, wireless station 120 may include a bearer coordination manager 510 that includes a local idle monitor 512, a status check message generator 514, a status check response monitor 516, and a status check response generator 518. Bearer coordination manager 510 may generally check for inactivity in multiple bearers for a multi-RAT dual connectivity scenario. When bearer coordination manager 510 confirms inactivity across all bearers in both wireless stations (e.g., eNB 205 and gNB 210) serving end device 110, bearer coordination manager 510 may initiate inactivity procedures to move end device 110 from a connected stat to an idle state.

Local idle monitor 512 may monitor for inactivity on bearers using wireless station 120. For example, local idle monitor 512 may detect an idle period (e.g., 1, 5, or 10 minutes) by using an idle timer that is initiated after each packet or flow through a wireless station. When local idle monitor 512 in a master wireless station 120 (e.g., eNB 205) detects inactivity in local bearers, local idle monitor 512 may initiate a status check for inactivity in a secondary wireless station 120 (e.g., gNB 210).

Status check message generator 514 may be used by a master wireless station 120 (e.g., eNB 205) to generate and send a status check message (e.g., inactivity status check 430) to check a status of bearers being handled by a secondary wireless station 120 (e.g., gNB 210). In one implementation, status check message generator 514 may send periodic status check messages (e.g., while local bearers on the master wireless station 120 remain idle) until an idle indication is received from the secondary wireless station 120 or until a status response message (e.g., inactivity status check response 440) is not received within a designated response window. These status check messages and responses protect the master wireless station 120 in case the secondary wireless station 120 undergoes any problem, such as a software error or another problem that prevents the secondary wireless station from providing a release request. If the master wireless station 120 does not receive a status response message from the secondary wireless station 120 within a small window (e.g., 50 ms), the master wireless station 120 may immediately release all bearers for end device 110 and go to idle mode. In one implementation, the periodicity of the status check messages may be configured by a network operator (e.g., every 10 seconds, 20 seconds, 1 minute, etc.), taking into account factors including a signaling load for the X2-C interface. In stable networks, an operator may decide to turn off periodic inactivity status check messages. In such a case eNB waits for gNB to send a release request with inactivity indication.

Status check response monitor 516 may detect and process status response messages (e.g., inactivity status check responses 440) from the secondary wireless station 120. When a status response message indicates there is an active bearer for the secondary wireless station 120, status response monitor may delay (or wait) initiating inactivity procedures for a corresponding end device 110. In one implementation, status check response monitor 516 may delay inactivity procedures until a release request (e.g., indicating inactivity of bearers for the secondary wireless station 120) is received from the secondary wireless station 120. In another implementation, status check response monitor 516 may delay inactivity procedures until a status response message is not received from the secondary wireless station 120 within a designated response window (e.g., 50 milliseconds from when the status check message was sent).

Status check response generator 518 may be used by a secondary wireless station 120 (e.g., gNB 210) to generate and send a status response message (e.g., inactivity status check response 440) to report a status of bearers being handled by the secondary wireless station 120. In one implementation, status check generator 518 must provide responses with the designated response window to prevent the master wireless station 120 from performing inactivity procedures for end device 110.

Although FIG. 5 shows exemplary logical components of wireless station 120, in other implementations, wireless station 120 may include fewer logical components, different logical components, or additional logical components than depicted in FIG. 5. Additionally or alternatively, one or more logical components of wireless station 120 may be performed by one or more devices in core network 140.

Figure 6:
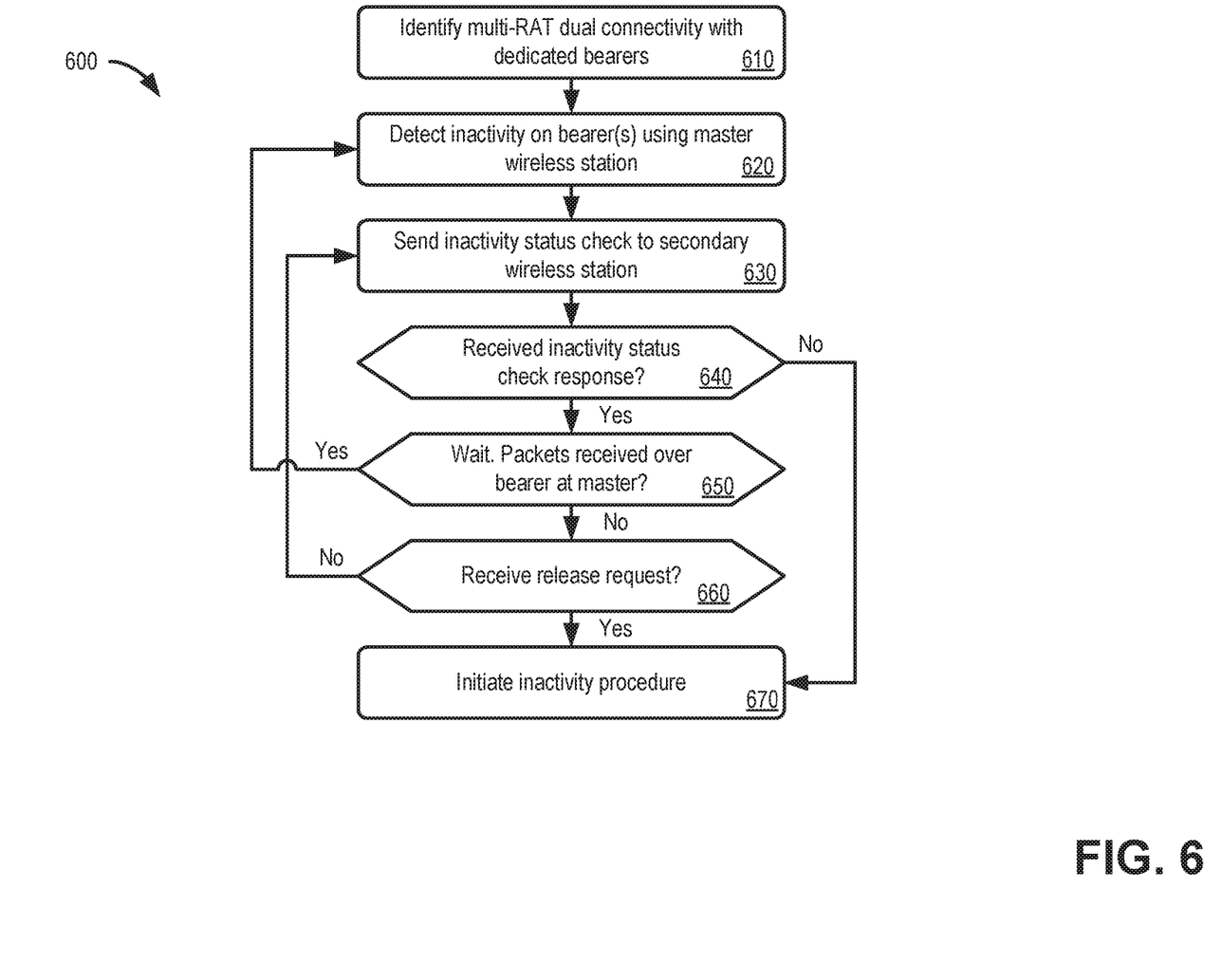
FIG. 6 is a flow diagram illustrating an exemplary process for monitoring and enforcing inactivity policies over dual-connectivity bearers, according to an implementation described herein.

FIG. 6 is a flow diagram illustrating an exemplary process 600 for monitoring and enforcing inactivity policies over dual-connectivity bearers, according to an implementation described herein. In one implementation, process 600 may be implemented a wireless station 120 serving a master node. In another implementation, process 600 may be implemented by wireless station 120 in conjunction with one or more other devices in network environment 100.

Referring to FIG. 6, process 600 may include identifying, for an end device, multi-RAT dual connectivity with dedicated bearers (block 610) and detecting inactivity on bearers using the master wireless station (block 620). For example, eNB 205 may be assigned as a master wireless station 120 and gNB 210 may be assigned as a secondary wireless station 120 for an end device 110 simultaneously connected to different RAT types with dedicated bearers using different wireless networks. eNB 205 may store bearer IDs for bearers used by end device 110 on both eNB 205 and gNB 210. eNB 205 (e.g., bearer coordination manager 510) may detect inactivity on one (or all) bearers for end device 110 that are using eNB 205.

Process 600 may further include sending an inactivity status check to a secondary wireless station (block 630) and determining if an inactive status check response is received (block 640). For example, eNB 205 (e.g., bearer coordination manager 510) may send inactivity status check 430 to gNB 210 via X2-C interface 406. Inactivity status check 430 may include a bearer identifier (ID) for the corresponding bearers on gNB 210. Inactivity status check 430 may prompt gNB 210 to respond with an inactivity status check response 440 within a small time window (e.g., configured at no more than 50, 100, or 200 milliseconds or some similar interval).

If an inactive status check response is received (block 640—Yes), process 600 may include waiting for the secondary wireless station while continuing to monitor for traffic over bearer(s) on the master wireless station (block 650). For example, in response to inactivity status check response 440 (e.g., indicating an active bearer for gNB 210), eNB 205 may take no action to initiate inactivity procedures.

If traffic over a bearer on the master wireless station is detected during the waiting interval (block 650—Yes), process 600 may return to block 620 to again detect inactivity on the bearers using the master wireless station. For example, if packets are detected over a bearer for eNB 205 while eNB 205 is waiting for a release signal from gNB 210, then eNB 205 will reset the idle timer for the local bearer to eventually detect another idle period for the local bearer.

If traffic over a bearer on the master wireless station is not detected during the waiting interval (block 650—No), process 600 may determine if a release signal is received from the secondary wireless station (block 660). For example, assuming the inactive state of bearers handled by eNB 205 remains unchanged, eNB 205 may look for a release signal from gNB 210. Once gNB 210 observes inactivity for its bearers, gNB 210 may send the release signal to eNB 205 with a bearer ID and a cause code indicating inactivity.

If a release signal is not received from the secondary wireless station (block 660—No), process 600 may return to block 630 to send another inactivity status check. The periodicity of inactivity status checks 430 may be configurable. Thus, eNB 205 may provide periodic inactivity status checks 430 while awaiting a release signal from gNB 210. The periodic inactivity status checks protect eNB 205 in the event that gNB 210 undergoes any problem and stops responding.

If a release signal is received (block 660—Yes) or if an inactive status check response is not received (block 640—No), process 600 may include initiating an inactivity procedure for the end device (block 670). For example, when no inactivity status check response 440 is received within an allotted time window, or when an affirmative release signal is received from gNB 210, eNB 205 may immediately release all bearers for the end device 110 and go to idle mode.

Figure 7:
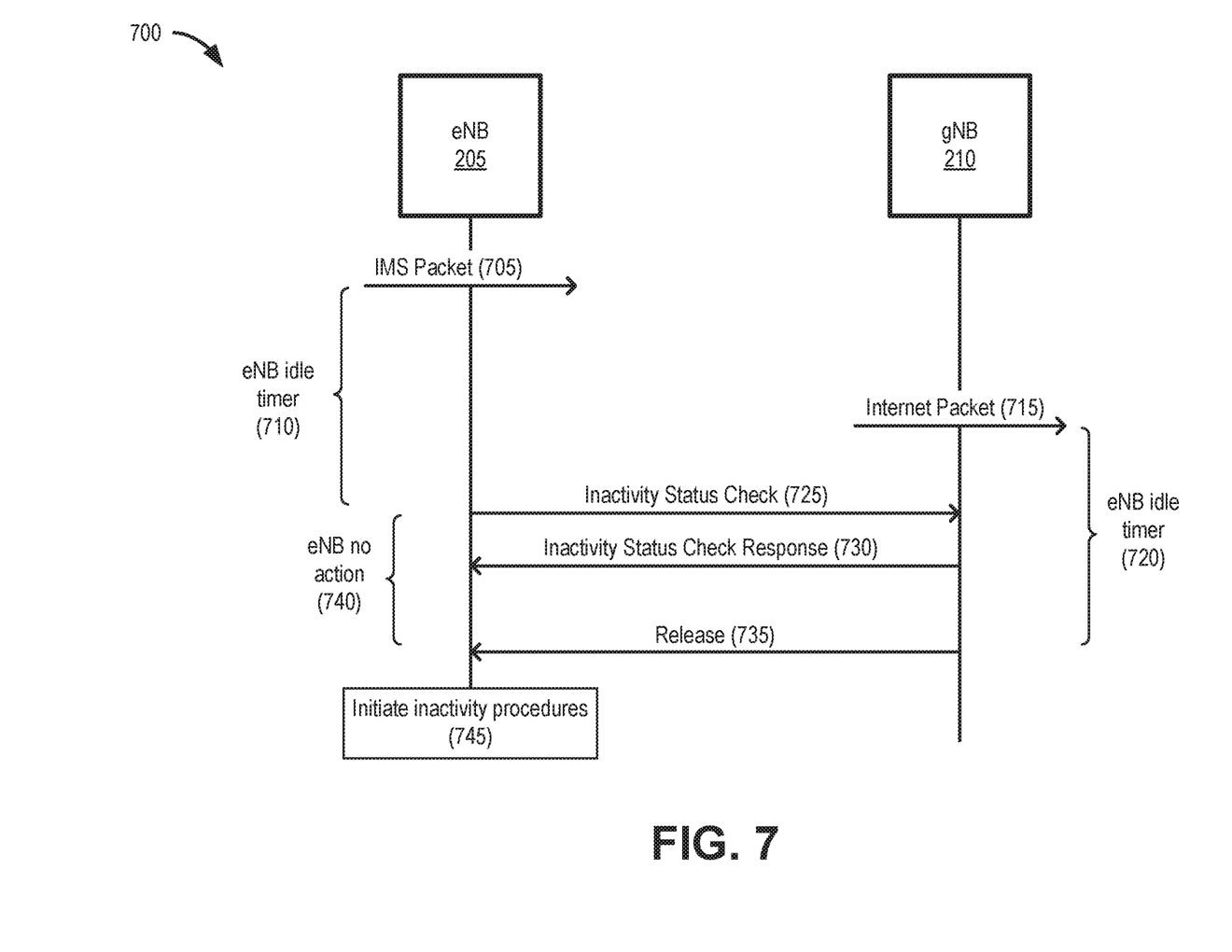
FIG. 7 is a signal flow diagram illustrating exemplary communications for monitoring and enforcing inactivity policies over dual-connectivity bearers in another portion of the network environment of FIG. 2.

FIG. 7 is signal flow diagram illustrating exemplary communications for monitoring and enforcing inactivity policies over dual-connectivity bearers in a portion 500 of network environment 100. Network portion 700 may include eNB 205 and gNB 210.

As shown in FIG. 7, assume again an IMS default bearer is handled by eNB 205 and Internet default bearer is handled by gNB 210 (although any arrangement of dedicated bearers may be used). In the example of FIG. 7, eNB 205 tracks a most recent IMS packet 705 and triggers an idle timer 710. Subsequent to the arrival of IMPS packet 705 at eNB 205, gNB 210 tracks a most recent Internet packet 715 and triggers on idle timer 720.

Based on idle timer 710, eNB 205 eventually observes inactivity on the IMS default bearer. However, eNB 205 cannot immediately take action to move end device 110 to an idle state, since eNB 205 is not aware of the status of Internet default bearer being handled by gNB 210. In such a case, eNB 205 may send a message 725 (e.g., an inactivity status check 430) to gNB 210 to check the status of bearers being handled by gNB 210. gNB 210 may respond to eNB 205 with a message 730 (e.g., an inactivity status check response 440) indicating that the bearers for gNB 210 are still active.

Message 730 causes eNB 205 to wait 740 for bearers being handled by gNB 210 to become inactive before taking any action. In one implementation (not shown in FIG. 7), eNB 205 may periodically send additional status check messages to gNB 210 while waiting. In one implementation, the periodicity of the status check messages may be configured by a network operator, taking into account several factors including X2-C/X2-U signaling overload. In another implementation, the periodicity of the status check messages may be automatically configured by eNB 205 or another device in core network 140 based on, for example, real-time network conditions. As such the periodicity of the status check messages to gNB 210 may change while eNB 205 is waiting for a release request from gNB 210.

Based on idle timer 720, gNB 210 eventually observes inactivity on the Internet default bearer. Once gNB 210 observes inactivity for its bearers, gNB 210 sends a release request 735 to eNB 205 with a cause code indicating inactivity. eNB 205 may at that point execute inactivity procedures 745 to move end device 110 from a connected state to an idle state.

Systems and methods described herein provide for coordination of inactivity procedures between wireless stations in a multi-RAT dual connectivity scenario. The systems and methods enable a master wireless station (or node) to check on the status of bearer activity in secondary nodes. The systems and methods also enable the master node to configure periodicity of status check messages to the secondary node or to disable the status check messages. Inactivity procedures are fundamental to cellular networks where resources are shared across several end devices. Procedures described herein prevent a situation where a master node may never release end device resources or may release resources when the end device is still active on a secondary node.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A first wireless station, comprising:
   a first communications interface for sending or receiving packets using a first wireless network;
   a second communications interface for exchanging messages with a second wireless station using a second wireless network different than the first wireless network;
   one or more memories to store instructions; and
   one or more processors configured to execute the instructions to:
   identify, for an end device, a multi-radio access technology (RAT) dual connectivity scenario with dedicated bearers,
   detect inactivity for a first bearer using the first wireless station,
   send, to the second wireless station and in response to the detecting, an inactivity status check for a second bearer of the multi-RAT dual connectivity scenario,
   wait for a release request from the other wireless station, when a response to the inactivity status check is received by the first wireless station within a designated time window, and
   initiate an inactivity procedure for the end device when the release request is received.

2. The first wireless station of claim 1, wherein the one or more processors are further configured to execute the instructions to:
   initiate the inactivity procedure for the end device when the response to the inactivity status check is not received within the designated time window.

3. The first wireless station of claim 1, wherein the second communications interface includes an X2-C interface for control communications between the first wireless station and the second wireless station.

4. The first wireless station of claim 1, wherein the first wireless station includes an evolved Node B (eNB) for an Evolved UNITS Terrestrial Radio Access Network (E-UTRAN), and wherein the second wireless station includes a next generation Node B (gNB) for a Fifth Generation New Radio (5G NR) radio access network (RAN).

5. The first wireless station of claim 1, wherein a value for the designated time window is less than or equal to 200 milliseconds.

6. The first wireless station of claim 1, wherein when waiting for a release request, the one or more processors are further configured to execute the instructions to:
send, to the second wireless station and at periodic intervals, additional inactivity status checks for the second bearer of the multi-RAT dual connectivity scenario.

7. The first wireless station of claim 1, wherein the inactivity status check includes a bearer identifier for the second bearer of the multi-RAT dual connectivity scenario.

8. The first wireless station of claim 1, wherein the one or more processors are further configured to execute the instructions to:
receive a response to the inactivity status check within the designated time window.

9. A method, comprising:
identifying, by a master wireless station and for an end device, a multi-radio access technology (RAT) dual connectivity scenario with dedicated bearers;
detecting, by the master wireless station, inactivity for a bearer using the master wireless station;
sending, to a secondary wireless station and in response to the detecting, an inactivity status check for another bearer of the multi-RAT dual connectivity scenario;
receiving a response to the inactivity status check within a designated time window;
in response to receiving the response to the inactivity status check within the designated time window, waiting, by the master wireless station, for a release request from the secondary wireless station; and
initiating, by the master wireless station, an inactivity procedure for the end device when the release request is received.

10. The method of claim 9, further comprising:
sending, to the secondary wireless station and at a periodic interval, an additional inactivity status check for the another bearer of the multi-RAT dual connectivity scenario.

11. The method of claim 10, further comprising:
obtaining, by the master wireless station, a new value for the periodic interval, and
sending, to the secondary wireless station and using the new value for the periodic interval, an additional inactivity status check for the another bearer of the multi-RAT dual connectivity scenario.

12. The method of claim 10, further comprising:
receiving, by the master wireless station, instructions to disable sending the inactivity status check,
second detecting, by the master wireless station, inactivity for a bearer using the master wireless station after receiving the instructions to disable sending the inactivity status check, and
waiting, after the second detecting, for a release request from the secondary wireless station.

13. The method of claim 10, further comprising:
initiating the inactivity procedure for the end device when a response to the additional inactivity status check is not received within the designated time window.

14. The method of claim 9, wherein sending the inactivity status check further comprises sending the inactivity status check using an X2-C interface.

15. The method of claim 9, wherein sending the inactivity status check includes:
sending, with the inactivity status check, a bearer identifier for the another bearer of the multi-RAT dual connectivity scenario.

16. The method of claim 15, further comprising:
receiving the response to the inactivity status check via an X2-C interface, wherein the response includes a bearer identifier for the another bearer of the multi-RAT dual connectivity scenario.

17. The method of claim 9; wherein the master wireless station includes an evolved Node B (eNB) for an Evolved UNITS Terrestrial Radio Access Network (E-UTRAN).

18. The method of claim 9, wherein the secondary wireless station includes a next generation Node B (gNB) for a Fifth Generation New Radio (5G NR) radio access network (RAN).

19. A non-transitory computer-readable medium containing instructions executable by at least one processor, the computer-readable medium comprising one or more instructions to cause the at least one processor to:
identify, for an end device, a multi-radio access technology (RAT) dual connectivity scenario with dedicated bearers;
detect inactivity for a bearer using a master wireless station;
send, to a secondary wireless station and in response to the detecting, an inactivity status check for another bearer of the multi-RAT dual connectivity scenario;
wait for a release request from the secondary wireless station, when a response to the inactivity status cheek is received from the secondary wireless station within a designated time window; and
initiate an inactivity procedure for the end device when the release request is received.

20. The non-transitory computer-readable medium of claim 19, further comprising instructions to cause the at least one processor to:
send, to the secondary wireless station and at a periodic interval, an additional inactivity status check for the another bearer of the multi-RAT dual connectivity scenario; and
initiate the inactivity procedure for the end device when a, response to the additional inactivity status check is not received within the designated time window.

* * * * *